United States Patent [19]

Albrecht

[11] 4,245,504
[45] Jan. 20, 1981

[54] ONE-WAY INDEX FOR GAS METERS

[75] Inventor: Charles W. Albrecht, Warminster, Pa.

[73] Assignee: The Singer Company, Stamford, Conn.

[21] Appl. No.: 30,504

[22] Filed: Apr. 16, 1979

[51] Int. Cl.³ ............................................ G01F 15/00
[52] U.S. Cl. ........................................ 73/275; 74/143
[58] Field of Search ............... 73/275; 74/118, 143; 235/94 R

[56] References Cited

U.S. PATENT DOCUMENTS

| 764,605 | 7/1904 | Lambert | 73/295 |
|---|---|---|---|
| 1,979,028 | 10/1934 | Ewart | 74/143 |
| 2,029,677 | 2/1936 | Schubert | 74/143 |
| 3,373,622 | 3/1968 | Stautmeister | 74/143 |
| 3,559,497 | 2/1971 | Steenackers et al. | 74/143 |

Primary Examiner—Herbert Goldstein
Attorney, Agent, or Firm—David L. Davis; Robert E. Smith; Edward L. Bell

[57] ABSTRACT

A gas meter is disclosed having a one-way index incorporated therein for causing the indicating means thereof to run only in a forward direction regardless of the actual direction of gas flow. A pivoting member is oscillated by a rotating cam coupled to the measuring means of the meter and includes pawls attached thereto for driving a ratchet wheel, coupled to the indicating means, in one direction only. By this arrangement, the oscillation of the member is independent of the direction of rotation of the cam, which rotation is indicative of the direction of gas flow.

1 Claim, 9 Drawing Figures

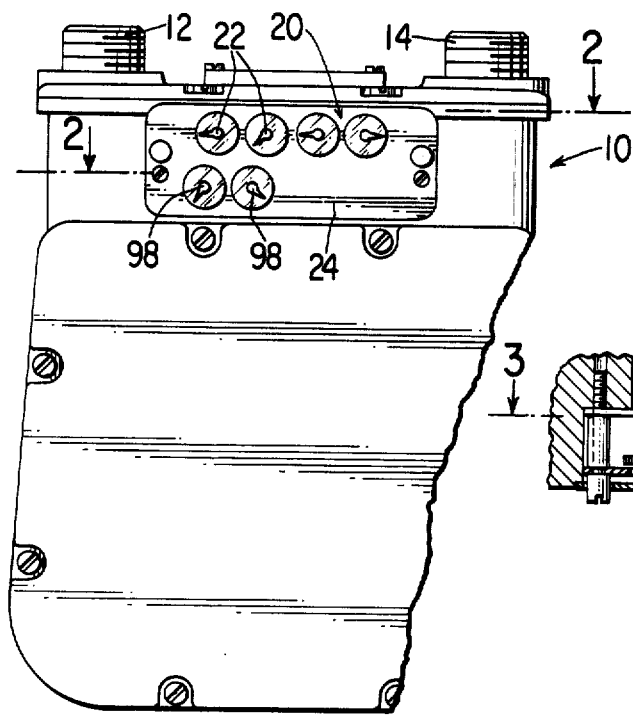
Fig. 2
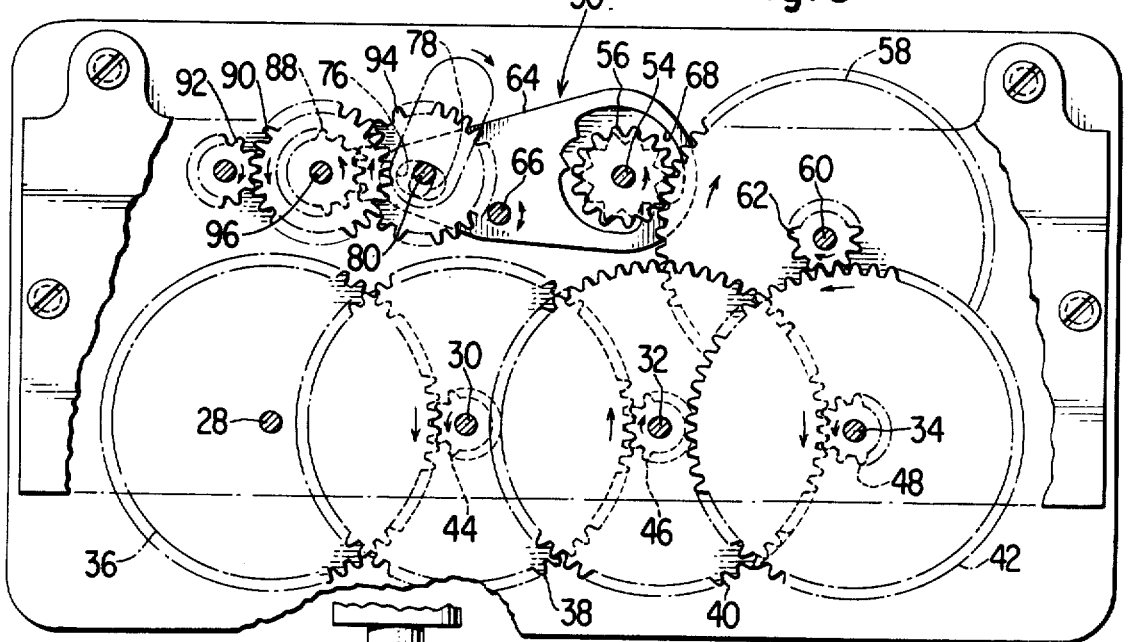
Fig. 1
Fig. 3
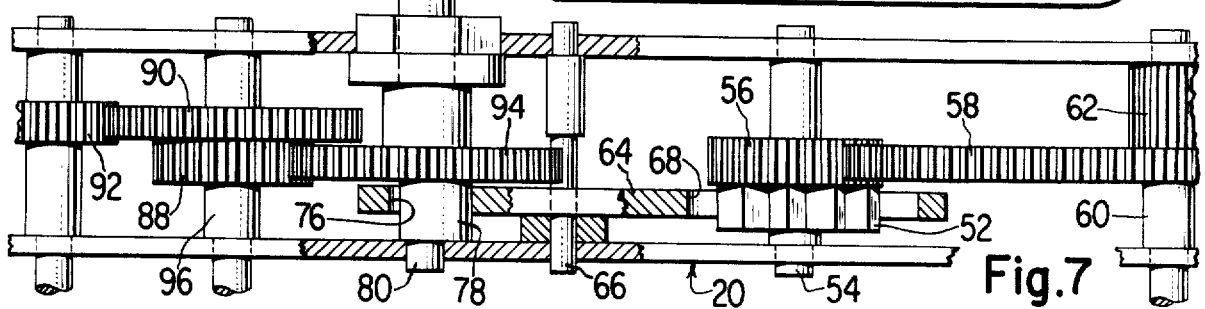
Fig. 7

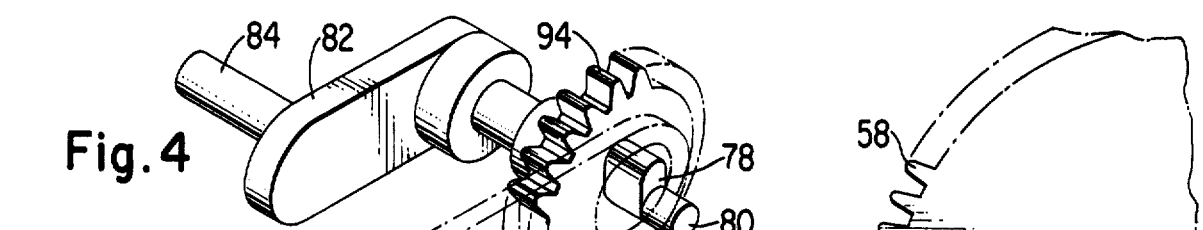
Fig. 4
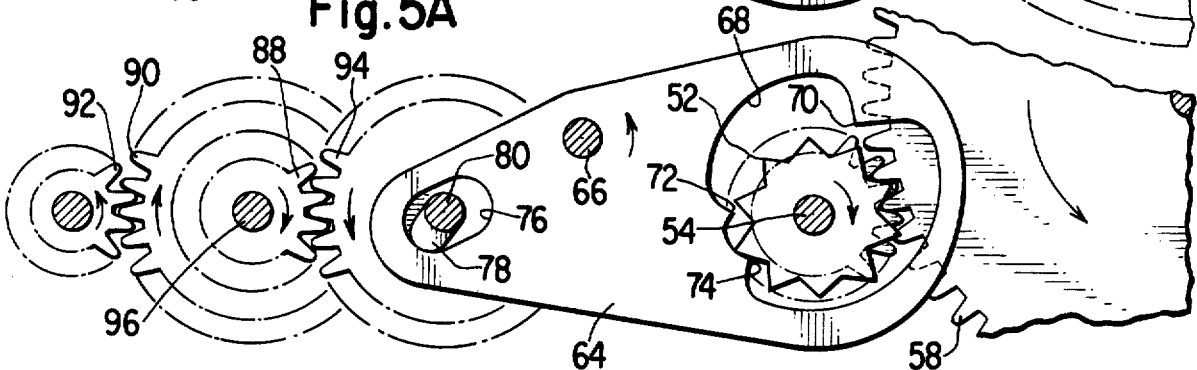
Fig. 5A
Fig. 5B
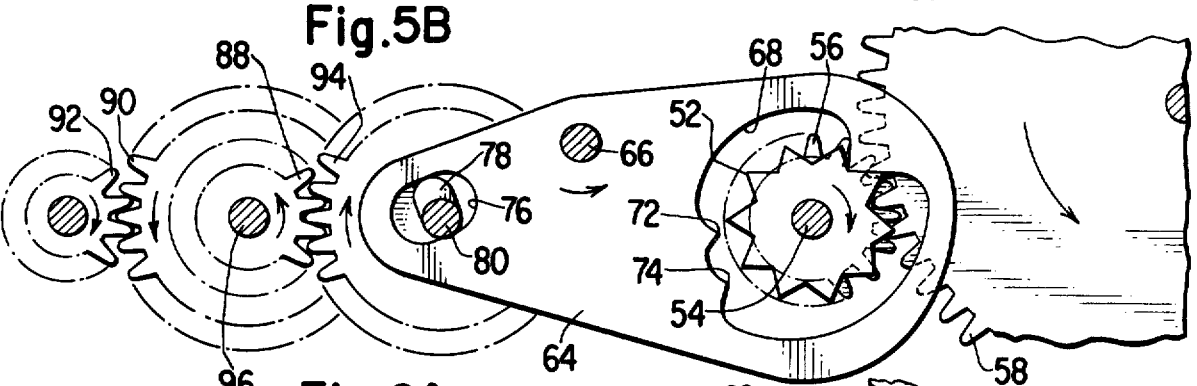
Fig. 6A
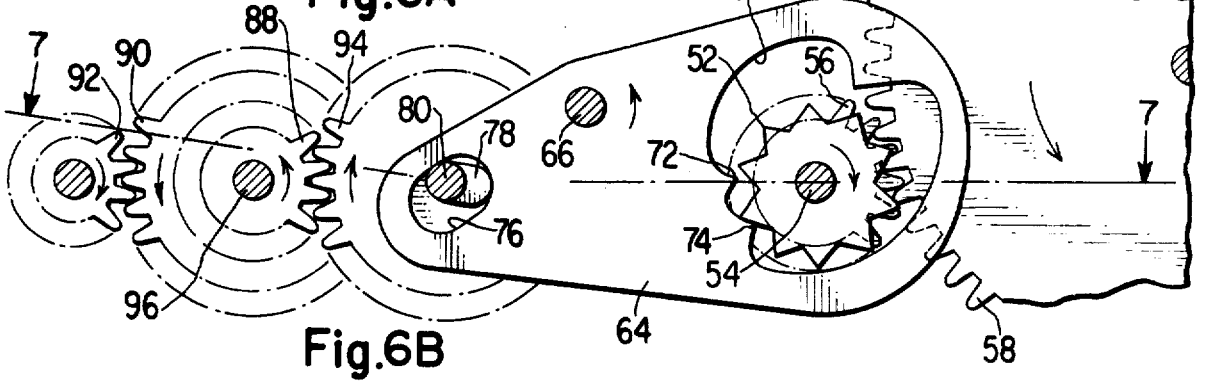
Fig. 6B

ONE-WAY INDEX FOR GAS METERS

DESCRIPTION

BACKGROUND OF THE INVENTION

This invention relates to gas meters, and in particular, to means for preventing fraudulent use thereof or "gas theft".

With the rising costs for the use of gas, as well as other energy sources, gas theft has become much more prevalent. Public utilities are losing significant amounts of revenue due to gas theft and in turn are attempting to recover these losses by raising the unit cost. With conventional gas meters it is surprisingly easy to perpetrate gas theft: the meter only needs to be removed and then temporarily reinstalled oppositely. The reverse gas flow through the meter causes the indicating mechanism to run in reverse showing an apparent negative gas consumption. After a predetermined period of time, the meter is reinstalled properly such that, when subsequently read, the indicating mechanism will show a total gas consumption considerably less than the actual consumption.

U.S. Pat. No. 764,605 of Lambert discloses a meter having an indexing device therein which causes the indicator to always run in a forward direction regardless of the actual direction of flow of the metered medium. However, the indexing device takes the form of a cam-actuated slide in which factors such as inertia and friction adversely affect the wear thereof.

SUMMARY OF THE INVENTION

An object of this invention is to provide a gas meter which discourages fraudulent use.

Another object of this invention is to provide a gas meter which will continue to run forwardly when the gas flow is reversed.

Another object of this invention is to provide a gas meter having means for one way operation which exhibits minimal wear.

These objects are achieved in a gas meter having inlet and outlet means, means for measuring the flow rate of gas therethrough, means for indicating the total quantity of gas flowing therethrough, a ratchet wheel for driving the indicating means, a pivotally mounted member having pawls for drivingly engaging the ratchet wheel, and means coupled to the measuring means for oscillating the member.

BRIEF DESCRIPTION OF THE DRAWINGS

With the above and additional objects and advantages in mind as will hereinafter appear, the invention will be described with reference to the attached drawings in which:

FIG. 1 is a front elevational view of a gas meter having the invention incorporated therein;

FIG. 2 is a cross-sectional view of the gas meter taken along the line 2—2 in FIG. 1, showing the drive mechanism for the indicating dials;

FIG. 3 is a cross-sectional view of the gas meter taken along the line 3—3 in FIG. 2 showing the invention as installed in the drive mechanism for the indicating dials;

FIG. 4 is a perspective view of the means for coupling the invention with the means for measuring the gas flow;

FIGS. 5A and 5B are front elevational views of the invention showing the range of positions of the invention when the gas flow is in one direction;

FIGS. 6A and 6B are front elevational views of the invention showing the range of positions of the invention when the gas flow is in the opposite direction from that shown in FIGS. 5A and 5B; and FIG. 7 is a cross-sectional view of the invention taken along the line 7—7 in FIG. 6B.

DESCRIPTION OF THE PREFERRED EMBODIMENT

Referring to FIGS. 1, 2 and 3, there is shown a standard gas meter 10 having an inlet pipe 12 and an outlet pipe 14. The gas meter 10 includes means (not shown) for measuring the flow of gas between the inlet pipe 12 and the outlet pipe 14 and converts the flow rate into rotary motion of a shaft 16 having a coupling 18 extending radially therefrom.

A gas consumption indicating assembly 20 is shown mounted to the front of the gas meter 10. The indicating assembly 20 includes a plurality of indicators 22 having a transparent cover 24 installed thereover. A gear train 26 is provided for driving the indicators 22 and includes shafts 28, 30, 32 and 34 to which the indicators are mounted. Gears 36, 38, 40 and 42 are respectively mounted to each of the shafts 28, 30, 32 and 34 while the shafts 30, 32 and 34 have respectively mounted thereto driver gears 44, 46 and 48 for driving the gears 36, 38 and 40, respectively. The ratio of the gears 36, 38 and 40 to the driver gears 44, 46 and 48 may be 10:1 such that the indicators 22 may record gas consumption in multiples of ten.

The gas consumption indicating assembly 20 further includes the one-way index 50 of this invention which couples the gear train 26 to the shaft 16 of the measuring means. The one-way index 50 includes a ratchet wheel 52 mounted to a shaft 54 journaled in the indicating assembly 20. A gear 56 also is mounted to the shaft 54 and engages a gear 58 coaxially mounted to a shaft 60 with a driver gear 62 which, in turn, engages the gear 42.

A member 64 is pivotally mounted near the midpoint thereof on a pivot pin 66 and is formed with an aperture 68 therethrough for encircling the ratchet wheel 52. The member 64 includes pawls 70, 72 and 74 extending into the aperture 68 both for driving the ratchet wheel 52 and for preventing reverse rotation of the ratchet wheel 52. The pawls 70, 72 and 74 are positoned about the periphery of the aperture 68 such that the pawl 70 engages the ratchet wheel 52 when the member 64 pivots in a clockwise direction and, conversely, the pawls 72 and 74 engage the ratchet wheel 52 when the member 64 pivot in a counterclockwise direction (see FIG. 5A). The member 64 is further formed with an elongate aperture 76 therethrough in the end opposite from the aperture 68. The aperture 76 drivingly embraces a cam 78 mounted to a shaft 80 having a right-angled coupling 82 attached thereto (see FIG. 4). Rotational motion is passed from the coupling 18 on the shaft 16 to the coupling 82 by means of a pin 84 mounted to the coupling 82. As shown in FIG. 3, additional gears 88, 90 and 92 may be driven by a gear 94 mounted on the shaft 80. The gear 94 engages the gear 88 which is coaxially mounted to a shaft 96 with the gear 90. The gear 90, in turn, engages the gear 92. Indicators 98 may be attached to the shaft 96 and the gear 92 which indicate the actual direction of gas flow and may be used to test the accuracy of the gas meter 10.

In operation, when gas flows through the meter 10 from the inlet pipe 12 to the outlet pipe 14, the measuring means causes the shaft 16 to rotate in a counterclockwise direction at a speed relative to the gas flow rate. Referring to FIGS. 5A and 5B, the rotation of the shaft 16 is transferred to the shaft 80 through the couplings 18 and 82 by the pin 84. The counterclockwise rotation of the shaft 80 rotates the cam 78 similarly causing the member 64 to oscillate due to the action of the cam 78 in the aperture 76. The oscillation of the member 64 causes the pawl 70 and the pawls 72 and 74 to alternately engage the ratchet wheel 52, driving the ratchet wheel 52 in a clockwise direction. This clockwise rotation of the wheel 52 is transferred by the gear 56 to the gear 58 and onto the rest of the gear train 26 through the gear 62.

By referring to FIGS. 6A and 6B, it can be seen that a reverse gas flow causes the shaft 16 to rotate in a clockwise direction. The clockwise rotation of the shaft 16 causes the cam 78 to rotate in a clockwise direction due to the couplings 18 and 82. The rotation of the cam 78 in the aperture 76 causes the member 64 to oscillate. This oscillation alternately engages the pawl 70 and the pawls 72 and 74 with the ratchet wheel 52 causing the wheel 52 to be incrementally advanced in a clockwise direction. It should now be apparent that the indicators 22 will run in the same direction regardless of the actual direction of gas flow, as evidenced by the continued clockwise rotation of the ratchet wheel 52 when the gas flow is in either direction.

By mounting the member 64 for pivotal motion, the effects of friction and inertia are minimized when contrasted with a sliding arrangement in which the movement of the entire mass must be arrested and then redirected oppositely. This allows for a greater life expectancy since the wear on the member 64 around the aperture 76 when engaged by the cam 78 is significantly lessened.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention. All such modifications which do not depart from the spirit of the invention are intended to be included within the scope of the appended claims.

I claim:

1. In a metering device having an inlet and an outlet, an output shaft, measuring means for rotating said output shaft at a rate and in a direction corresponding to the flow rate and direction, respectively, of a medium flowing between said inlet and said outlet, and means for indicating the total quantity of said medium flowing between said inlet and said outlet, a one-way indexing arrangement connected to drive said indicating means from said measuring means comprising:

a ratchet wheel drivingly coupled to said indicating means;

a member having pawls thereon for engaging said ratchet wheel, said member being pivotally mounted in said metering device for oscillatory motion about a pivot point, said member imparting rotation to said ratchet wheel in a first direction when said member is oscillating and arresting movement of said wheel in a second direction opposite to said first direction when said member is not oscillating; and drive means coupled to said output shaft for oscillating said member in response to rotation of said output shaft, said drive means comprising a cam affixed to said output shaft and said member being formed with an elongate aperture therein for embracing said cam whereby rotation of said cam in either direction, corresponding to the direction of flow of said medium between said inlet and said outlet, imparts oscillatory motion to said member causing said ratchet wheel to rotate only in said first direction thereof.

* * * * *